(No Model.)
J. B. ABERNATHY.
NUT LOCK.
No. 244,510. Patented July 19, 1881.
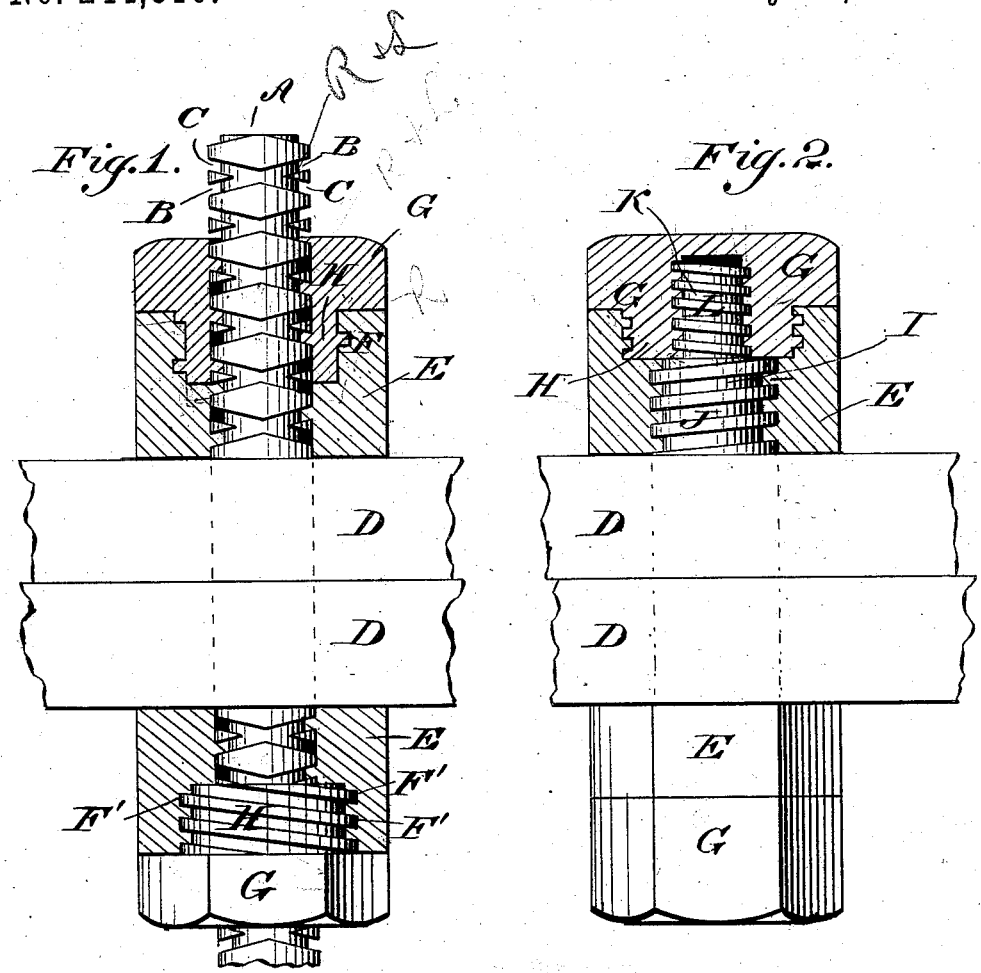
WITNESSES:
Donn I. Twitchell
C. Sedgwick
INVENTOR:
J. B. Abernathy
BY Munn & Co
ATTORNEYS.

UNITED STATES PATENT OFFICE.

JOHN B. ABERNATHY, OF COVINGTON, KENTUCKY.

NUT-LOCK.

SPECIFICATION forming part of Letters Patent No. 244,510, dated July 19, 1881.

Application filed April 16, 1881. (No model.)

*To all whom it may concern:*

Be it known that I, JOHN B. ABERNATHY, of Covington, in the county of Kenton and State of Kentucky, have invented a new and Improved Nut-Lock, of which the following is a full, clear, and exact description.

The invention consists in a nut provided with a threaded central recess or cavity in its upper surface to receive a central threaded projection of a second nut, which is screwed on the bolt after the first nut, the threads of the projection taking in those of the cavity thus uniting the two nuts.

In the accompanying drawings, Figure 1 is a view of a bolt having crossing right and left screw-threads, and provided with my improved nut-lock, the nut with the projection being shown in section in the upper part of the figure and in face view in the lower part. Fig. 2 is a view of a bolt having a right-hand screw-thread, but provided with an extension of less diameter, and having a left-hand screw-thread, which is also provided with my improved nut-lock.

Similar letters of reference indicate corresponding pasts.

The bolt A is provided with the right-hand screw-thread B and the left-hand screw-thread C, which cross each other, as shown. One end of the bolt is provided with a head, or both ends may be provided with nuts, as may be desired. After the bolt has been passed through the two plates D D to be united, a nut, E, is screwed on the bolt, taking in the right-hand thread B and pressing the two plates D D together. This nut E is provided with a central cavity or recess having a single left-hand thread, F, or a double left-hand thread, F', as may be desired. A left-hand nut, G, having a central projection, H, of the same diameter as the cavity in the nut E, on the surface facing this nut E, is screwed on the bolt A, taking in the left-hand thread C. The projection H is provided with a single or double left-hand screw-thread, in the same manner as the cavity in the nut E. Consequently the threads of the projection H and those of the cavity will take in each other, and the two nuts E and G will be firmly united. If the nut E unscrews, it must turn from right to left; but this it cannot do, as it is united with the nut G, and would thus turn this nut from right to left also—that is, it would draw the nut G up tight. The nut E can only be removed if the nut G is first removed.

Instead of having crossed right and left-hand threads, the bolt I may have a right-hand thread, J, throughout, and may be provided with an extension, K, of less diameter than the bolt I, and provided with a left-hand thread, L. The nut E will then take in the threads of the bolt I only, whereas the nut G takes in the threads of the extension K, as shown in Fig. 2.

Having thus described my invention, I claim as new and desire to secure by Letters Patent—

The combination of the bolt A, having right and left crossing threads B C, the nut E, having cavity with left thread F', and the nut G, having central projection, H, screwing on bolt A and into the cavity of nut E, as shown and described.

JOHN BLACKSTONE ABERNATHY.

Witnesses:
J. P. PATTON,
J. W. SANDFORD.